Dec. 7, 1926.

H. E. BOECKENHAUER

FLASH LIGHT

Filed Jan. 16, 1926

1,609,901

Inventor

H. E. Boeckenhauer

By Clarence A O'Brien,

Attorney

Patented Dec. 7, 1926.

1,609,901

UNITED STATES PATENT OFFICE.

HAROLD ELMER BOECKENHAUER, OF FAULKTON, SOUTH DAKOTA.

FLASH LIGHT.

Application filed January 16, 1926. Serial No. 81,759.

My present invention pertains to flash lights, and contemplates the provision of readily adjustable means through the medium of which the light afforded by the flash light may be regulated as different conditions demand, the regulating means being simple and compact so as not to render the flash light cumbersome, and being susceptible of adjustment by the thumb or finger of the hand in which the flash light is carried, leaving the other hand of the user free.

Other objects and practical advantages of the invention will be fully understood from the following description and claims when the same are read in connection with the drawings, accompanying and forming part of this specification, in which:—

Similar numerals of reference designate corresponding parts in all of the views of the drawings.

Figure 1:
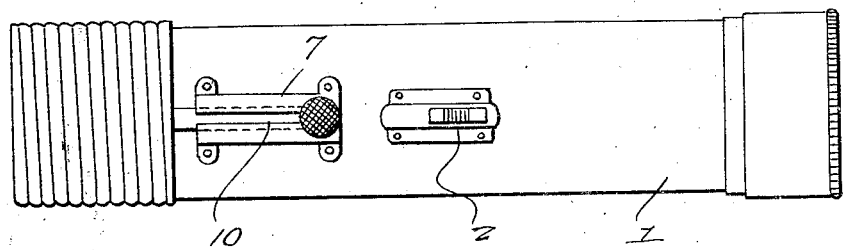
Figure 1 is a plan view of a flash light equipped with the preferred embodiment of my invention.
Figure 2:
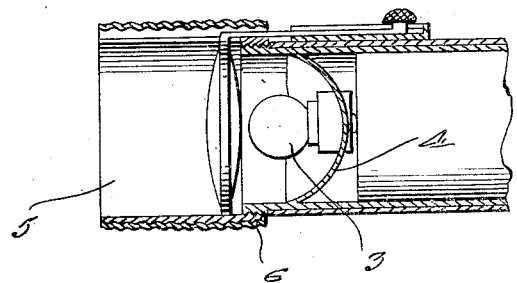
Figure 2 is an enlarged longitudinal diametrical section of a portion of the flash light with my novel lens and its appurtenances in elevation.
Figure 3:
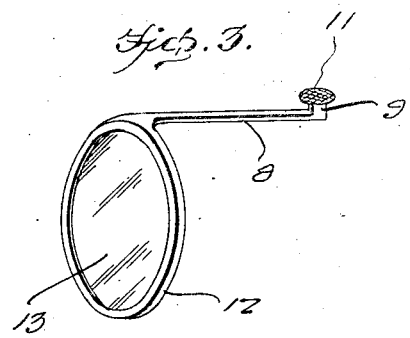
Figure 3 is a detail perspective showing the lens and the lens holder and adjuster per se.

The flash light in general may be and preferably is of the ordinary well known construction, and it is therefore unnecessary to describe the same in detail except to say that the flash light body is designated by 1, its switch by 2, its lamp by 3 and its reflector by 4.

In accordance with the preferred embodiment of my invention a tubular extension guide 5 is threaded at 6 or otherwise appropriately secured on the forward portion of the body 1.

Also in accordance with the preferred embodiment of my invention, a longitudinal guide 7 is provided on the outer side of the body 1, and in said guide 7 is disposed and movable rectilinearly a shank 8 with a lateral finger piece 9 at its rear end; the said finger piece 9 being guided in the longitudinal slot 10 of the guide member 7 and being equipped with a knurled head 11 to facilitate movement of the shank 8 through the medium of the thumb of a person using the flash light. Carried at the forward end of the shank 8 and fixed with respect thereto and formed, by preference, integral with the shank 8 is an annular holder 12 for a lens 13, it being within the purview of my invention to make the holder 12 narrow or of little length or long and of a length considerably greater than the thickness of the lens 13.

When the holder 12 is of a length considerably greater than the thickness of the lens 13, it will, of course, be extended rearwardly from the lens. I would also have it understood that the extension guide 5 may be omitted when the holder 12 is extended as stated.

The holder 12 and the lens 13 therein are freely movable rectilinearly in the tubular extension 5 by stress applied to the knurled head 11, and from this it follows that while operating the flash light the user is enabled with the thumb of the hand in which he holds the flash light to vary the distance between the lens 13 and the lamp 3 so as to change or regulate the light afforded by the flash light and emitted from the forward end of the tubular extension 5.

Notwithstanding the practical advantages ascribed to and possessed by my improvement as set forth in the foregoing, it will be noted that the improvement is simple and inexpensive in construction and therefore is not likely to increase the cost of producing a flash light to any material extent.

The embodiment herein illustrated and described constitutes the best practical embodiment of my invention of which I am cognizant. I do not desire, however, to be understood as confining myself to the specific construction and relative arrangement of parts as disclosed, my invention being defined by my appended claims within the scope of which changes in structure and arrangement may be made without departure from my invention.

Having described my invention, what I claim and desire to secure by Letters-Patent, is:—

1. In a flash light and in combination, a body, a lamp, a reflector back of the lamp, a switch complementary to the lamp and arranged exteriorly of the body, a longitudinal guide on the outer side of the side wall of the body, a lens disposed in front of the lamp, a holder carrying the said lens and adjustable longitudinally relative to the body, and a longitudinal shank fixed with respect to said holder and movable in said guide and between the same and the side wall of the body and terminating in a finger piece disposed exteriorly of the exterior guide on the body and adjacent to the said switch complementary to the lamp.

2. In a flash light, a body, a lamp, a reflector back of the lamp, a switch complementary to the lamp and arranged exteriorly of the body, a forward tubular extension on the body, a longitudinal guide on the body, a lens disposed in front of the lamp, a holder carrying the said lens and adjustable longitudinally in said tubular extension, and a shank fixed with respect to said holder and movable in said guide and relative to the body and tubular extension and terminating in a finger piece disposed exteriorly of the body and adjacent to the said switch complementary to the lamp.

In testimony whereof I affix my signature.

HAROLD ELMER BOECKENHAUER.